United States Patent Office 3,416,878
Patented Dec. 17, 1968

3,416,878
PADDING DRIED REACTIVE DYE IMPREGNATED CELLULOSE TEXTILES WITH 48–52° BAUMÉ SODIUM SILICATE FOR STEAM FIXATION OF THE DYE
Hermann Biber, Kobe, Japan, assignor to Farbwerke Hoechst Aktiengesellschaft vormals Meister Lucius & Bruning, Frankfurt am Main, Germany, a corporation of Germany
No Drawing. Filed Jan. 3, 1968, Ser. No. 695,351
Claims priority, application Germany, Jan. 10, 1967,
F 51,212
7 Claims. (Cl. 8—54.2)

ABSTRACT OF THE DISCLOSURE

The invention includes the step of printing a sulfone ethyl sulfate ester of an azo dye on a cellulose fabric, drying the fabric, then padding the fabric 48–52° Baumé liquid sodium silicate and then steaming the fabric to develop the dye on the fabric. The fabric is washed with a sodium metaphosphate and a synthetic detergent.

Other reactive dyes, such as vinylsulfone, chlorotriazine, dichloroquinoxaline, 2,2,3,3-tetrafluorocyclobutane-1-acryloylamine and β-phenylsulfone propionylamine type dyes, can be used in this process. Also, non-reactive dyes within reactive hydrogens can be printed with reactive compounds, such as 1,3,5-triacryloyl-hexahydro-s-triazine, methylene-bisacrylamide and 2,4,6-triethylamino-s-triazine, in this process.

---

It is known that reactive dyestuffs can be fixed fast on textile materials of native or regenerated cellulose with the aid of alkalis or alkali-forming compounds. The choice of the alkaline substances or the alkali-forming compounds depends on the nature of the reactive groups contained in the dyestuffs used and further on the nature of the fibres to be dyed as well as on the application process intended.

According to the known two-phase printing processes fast fixation of the reactive dyestuff on textile material of native or regenerated cellulose is carried out in that the dyestuff is applied to the fabric in the first step by means of a printing paste which contains water and a thickening agent which is incapable of reacting, and then, in the second step, the thus obtained print, after drying, is impregnated with an aqueous, more or less strong alkaline, salt-containing bath and subsequently fixed by the action of heat (two-phase steaming process), or is fixed by dipping it into the alkaline bath at boiling temperature (wet fixation process), or is padded with the alkaline bath and fixed according to the cold dwell method. When using alkaline, salt-containing aqueous baths as fixing agents, unimportant variations of the concentration of the bath, of the fixation period and of the temperature may have negative effects on the yield of the dyestuff and on the appearance of the prints. Thus, for example with some dyestuffs a change of the shade may occur on account of partial hydrolysis, as is the case with the copper complex compound of the dyestuff of the formula.

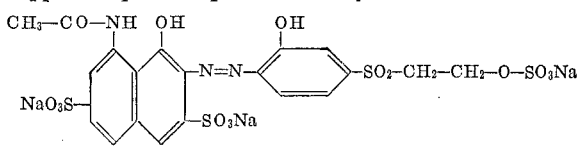

Now it has been found that reactive dyestuffs can be fixed fast on textile materials of native or regenerated cellulose according to a two-phase steaming process by printing on the textile material either an organic dyestuff which contains at least one β-hydroxyethylsulfone sulfuric acid ester group, vinylsulfone group, monochlorotriazine group, dichlorotriazine group, 2,2,3,3-tetrafluorocyclobutane-1-acryloylamino group, vinylsulfonylamino group, β-hydroxyethylsulfonylamino sulfuric acid ester group, β-phenylsulfonylpropionylamino group or dichloroquinoxaline radical, or an organic dyestuff containing at least one nucleophilic group and a colorless organic compound containing at least two reactive groups, which groups are capable of reacting with the fibre as well as with the nucleophilic groups of said dyestuff, by means of a printing paste which further contains water and a thickening agent, then impregnating the print so obtained, after drying, with a liquid alkali metal silicate of the concentration of about 48 to about 52° Bé. at a pH-value of about 11 to 12, and subsequently steaming it at open width and entirely free from creases. Preferably a liquid sodium silicate is used for the impregnation of the print.

As reactive dyestuffs there can be used according to the process of the present invention dyestuffs from different organic dyestuff classes, for example, azo dyestuffs and anthraquinone dyestuffs, which contain at least one of the above-mentioned reactive groups, or dyestuffs of such kind which—owing to the presence of nucleophilic groups—are capable of reacting with a colorless compound containing at least two reactive groups, said groups being capable of reacting with the fibre as well as with nucleophilic groups in said dyestuffs.

As compounds containing at least two reactive groups which are capable of reacting with the fibre as well as with the dyestuffs containing nucleophilic groups there can be mentioned for example:
(a) 1,3,5-tri-(acryloyl)-hexahydro-s-triazine of the formula

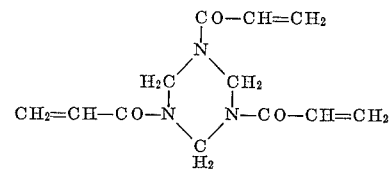

(b) methylene-bisacrylic acid amide of the formula

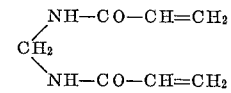

(c) 2,4,6-triethyleneimino-s-triazine of the formula

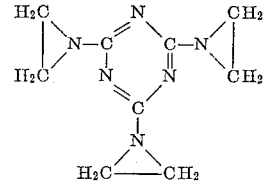

As dyestuffs capable of reacting with the colorless compounds containing at least two reactive groups preferably dyestuffs of the azo- and anthraquinone-series are appropriate which contain as nucleophilic groups, for example, sulfonic acid amide groups, N-mono substitued sulfonic acid amide groups, hydroxy groups, mercapto groups and/or acetoacetyl groups and/or heterocyclic ring systems containing imino groups.

The optimum concentration of liquid alkali metal silicate and the steaming period which has to be applied within the scope mentioned in the individual cases must be adapted to the respective reactive dyestuff used and to the amount of this dyestuff which is to be fixed.

Of the liquid alkali metal silicates (water-glasses) which are used according to the process of the present invention preferably liquid sodium silicate (soda water-glass) of the above-mentioned concentration and pH-range and of a density of about 1.48 to about 1.55 as well as of a proportion by weight of $Na_2O:SiO_2$ of 1:2.1 to 1:3 is applied.

When impregnating according to the process of the present invention the temperature of the alkali metal silicates used may be, for example, room temperature. Depending on the mode of the impregnation applied, it may be of advantage to use alkali metal silicate having a slightly elevated temperature, for example about 40–50° C., because at increased temperatures the viscosity of the alkali metal silicate is correspondingly reduced and it can thus be handled more easily.

The steaming temperatures range between about 101° and about 125° C. The steaming period may vary within wide limits. Suitable is the use of a steaming period of about 10 to 40 seconds, but a steaming period extended to about 200 seconds has no negative effects.

Suitably thickening agents are neutral, weakly alkaline or weakly acid reacting thickening agents such, for example, as alginates, various types of gum, alkyl celluloses or hydroxy-ethyl celluloses, as well as mixtures thereof and even emulsions or semi-emulsions prepared from the thickeners with the aid of appropriate emulsifiers.

The technical advantage achieved with the application of the liquid alkali metal silicate as fixing agent lies in the fact that sources of errors which are possible when preparing the commonly known aqueous fixing baths, do not occur, that an excellent reproducibility of the tints is guaranteed, that the yield of dyestuff being fixed is throughout superior to the known similar processes, and that the prints do not suffer a change in the tint and do not flow during the steaming period. Furthermore, it is advantageous, that the impregnation of the primary prints with the alkali metal silicates is not limited to the pad-dyeing but can also be carried out by slop-padding, nip-padding, over-printing by means of hatching rolls or screen printing machines, dipping or manual application. Besides, a considerably greater number of dyestuffs can be applied for the present process as is the case in connection with the known pad- and air-passage process and the cold dwell process, which methods work with an equeous salt- and alkali-containing bath. Even the period of exposure to the steaming atmosphere is not submitted to such narrow limits as with the known two-phase steaming processes for fast fixation of the reactive dyestuffs. Furthermore, piling up of the prints on each other after steaming it is possible with using the liquid alkali metal silicates without risking the staining or the bleeding, in contrast to the fixaton of the dyestuffs by using aqueous alkaline fixing baths.

The liquid alkali metal silicates used according to the process of the present invention are not dyed when impregnating the primary prints, whatever form of impregnation is applied, since the dyestuffs used are not soluble into the alkali metal silicate. Fixation of the dyestuffs and the after-treatment of the prints can be carried out continuously (Example 1) with appropriate arrangement of the steaming and washing aggregates.

The following examples serve to illustrate the invention but they are not intended to limit it thereto; the parts being by weight unless otherwise stated.

EXAMPLE 1

40 parts of the dyestuff of the formula

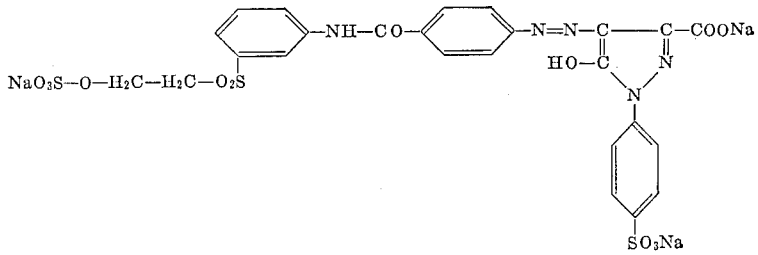

are dissolved in 300 parts of hot water and introduced into 400 parts of an aqueous alginate thickener of 4% strength which contains 5 parts of a complex forming agent on the basis of polymeric sodium metaphosphate per 1000 parts of thickener.

After addition of 15 parts of the sodium salt of metanitrobenzene sulfonic acid the whole is made up to 1000 parts by addition of 245 parts of water or 245 parts of an aqueous alginate thickener of 4% strength, depending on the viscosity required.

The thus prepared printing paste is printed on a fabric consisting of cotton or staple fibre by means of a cylinder printing machine. After drying, the printed fabric is padded with liquid sodium silicate of 48–52° Baumé and it is steamed, without interposition of an air passage or intermediate drying, in an arched steamer for 20 seconds at 101–103° C.

The thus obtained print is then rinsed in warm water baths at a temperature of 30–40° C. until the baths show a neutral reaction. Thereupon, the print is treated for some minutes with water of about 60° C., the water containing 3 parts of a complex forming agent on the basis of a polymeric sodium metaphosphate per 1000 parts by volume, subsequently it is soaped for about 10 minutes with a 1% aqueous solution of a synthetic detergent (sodium salt of the condensation product of oleic acid and N-methyltaurine) and finally rinsed and dried.

There is obtained a yellow print having good fastness to light and to wet processing.

EXAMPLE 2

40 parts of the dyestuff of the formula

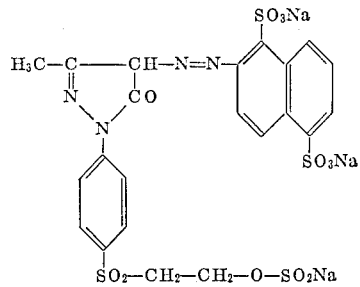

are dissolved in 300 parts of hot water and introduced into 400 parts of an equeous alginate thickener of 4% strength which contains 5 parts of a complex forming agent on the basis of polymeric sodium metaphosphate per 1,000 parts of thickener.

After addition of 15 parts of the sodium salt of metanitrobenzene sulfonic acid the whole is made up to 1,000 parts by addition of 245 parts of water or 245 parts of an equeous elginate thickener of 4% strength, depending on the viscosity required.

The thus prepared printing paste is printed on a fabric consisting of cotton or staple fibre by means of a cylinder printing machine. After drying, the printed fabric is padded with liquid sodium silicate of 48°–52° Baumé and it is immediately steamed in an arched steamer for 20 seconds at 101–103° C.

After an after-treatment of the fabric as described in Example 1 there is obtained a yellow print having good fastness to light and to wet processing.

EXAMPLE 3

40 parts of the dyestuff of the formula $$H_3C-OC-HN-\underset{\underset{SO_3Na}{|}}{\overset{\overset{OH}{|}}{\bigcirc\bigcirc}}-N=N-\bigcirc-SO_2-CH_2-CH_2-O-SO_3Na$$

are dissolved in 300 parts of hot water and introduced into 400 parts of an aqueous alginate thickner of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to the 1000 parts by addition of 245 parts of water or 245 parts of an aqueous alginate thickener of 4% strength, depending on the viscosity required.

The thus prepared printing paste is printed on a fabric consisting of cotton or staple fibre by means of a cylinder printing machine. After drying, the printed fabric is padded with liquid sodium silicate of 48–52° Baumé and it is steamed, without interposition of an air passage or intermediate drying, in a tunnel steamer for 18 seconds at 108–110° C.

After an after-treatment of the fabric as described in Example 1 there is obtained an orange print having good fastness to light and to wet processing.

EXAMPLE 4

40 parts of the dyestuff of the formula $$\underset{\underset{O}{\overset{O}{\parallel}}}{\bigcirc\bigcirc}\underset{NH-\bigcirc-SO_2-CH_2-CH_2-O-SO_3Na}{\overset{NH_2}{-SO_3Na}}$$

are dissolved in 300 parts of hot water and introduced into 400 parts of an aqueous alginate thickener of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to 1000 parts by addition of 245 parts of water or 245 parts of an aqueous alginate thickener of 4% strength, depending on the viscosity required.

The thus prepared printing paste is printed on a fabric consisting of cotton or staple fibre by means of a screen printing machine. After drying, the printed fabric is padded with liquid sodium silicate of 48–52° Baumé and it is steamed, without interposition of an air passage or intermediate drying, in a tower steamer for 15 seconds at 118°–122° C.

After an after-treatment of the fabric as described in Example 1 there is obtained a blue print having good fastness to light and to wet processing.

EXAMPLE 5

40 parts of the cobalt complex compound of the dyestuff of the formula $$NaO_3S-\bigcirc\bigcirc\underset{NH_2}{-N=N-}\underset{}{\overset{HO-}{\bigcirc}}-SO_2-CH_2-CH_2-O-SO_3Na$$

are dissolved in 300 parts of hot water and introduced into 400 parts of an aqueous alginate thickener of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to 1000 parts by addition of 245 parts of water or 245 parts of an aqueous alginate thickener of 4% strength, depending on the viscosity required.

The thus prepared printing paste is printed on a fabric consisting of cotton by means of a cylinder printing machine. After drying, the printed fabric is padded with liquid sodium silicate of 52° Baumé and it is immediately steamed in an arched steamer for 25 seconds at 101–103° C.

After an after-treatment of the fabric as described in Example 1 there is obtained a black print having good fastness to light and to wet processing.

EXAMPLE 6

40 parts of a mixture of the dyestuffs of the formulae

[copper phthalocyanine complex structure with R substituents and $NaO_3S$, $SO_3Na$ groups]

and

[copper phthalocyanine complex structure with R substituent and $NaO_3S$, $SO_3Na$ groups]

(R represents herein the grouping $$-SO_2-NH-\bigcirc-SO_2-CH_2-CH_2-O-SO_3Na)$$

are dissolved, after mixing with 100 parts of urea, in 300 parts of hot water and introduced into 400 parts of an aqueous alginate thickener of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to 1000 parts by addition of 145 parts of water or 145 parts of an aqueous alginate thickener of 4% strength, depending on the viscosity required.

The thus prepared printing paste is printed on a fabric consisting of cotton or staple fibre by means of a cylinder printing machine. After drying, the printed fabric is padded with liquid sodium silicate of 52° Baumé and it is steamed, without interposition of an air passage or intermediate drying, in a tunnel steamer for 25 seconds at 101–103° C.

After an after-treatment of the fabric as described in Example 1 there is obtained a turquoise print having good fastness to light and to wet processing.

EXAMPLE 7

40 parts of a mixture of the dyestuffs of the formulae

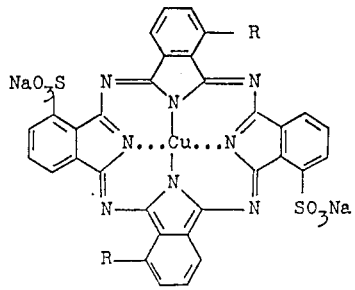

and

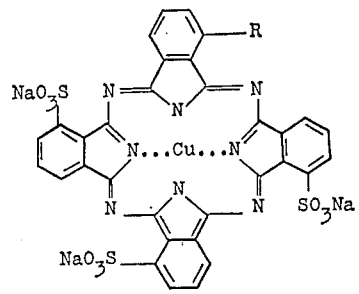

(R represents herein the grouping

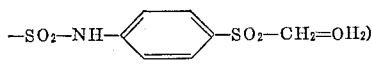

are dissolved, after mixing with 100 parts of urea, in 300 parts of hot water and introduced into 400 parts of an aqueous alginate thickener of 4% strength which contains 5 parts of a complex forming agent on the basis of polymeric sodium metaphosphate per 1,000 parts of thickener.

After addition of 15 parts of the sodium salt of meta-nitrobenzene sulfonic acid the whole is made up to 1000 parts by addition of 145 parts of water or 145 parts of an an aqueous alginate thickener of 4% strength, depending on the viscosity required.

The thus prepared printing paste is printed on a fabric consisting of cotton by means of a cylinder printing machine. After drying, the printed fabric is slop-padded with liquid sodium silicate of 52° Baumé and it is steamed in an arched steamer for 40 seconds at 101–103° C.

After an after-treatment of the fabric as described in Example 1, there is obtained a turquoise print having good fastness to light and to wet processing.

EXAMPLE 8

40 parts of the dyestuff of the formula

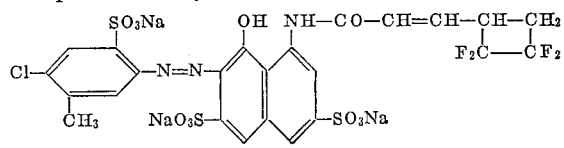

are dissolved in 300 parts of hot water and introduced into 400 parts of an aqueous alginate thickener of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to 1000 parts by addition of 245 parts of water or 245 parts of an aqueous alginate thickener of 4% strength, depending on the viscosity required.

The thus prepared printing paste is printed on a fabric consisting of cotton by means of a screen printing machine. After drying, the printed fabric is padded with liquid sodium silicate of 48–52° Baumé and it is immediately steamed in an arched steamer for 20 seconds at 101–103° C.

After an after-treatment of the fabric as described in Example 1 there is obtained a red print having good fastness to light and to wet processing.

EXAMPLE 9

40 parts of the dyestuff of the formula

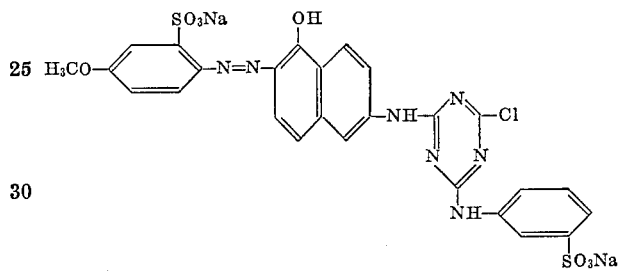

are dissolved in 300 parts of hot water and introduced into 400 parts of an aqueous alginate thickener of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to 1000 parts by addition of 245 parts of water or 245 parts of an aqueous alginate thickener or 4% strength, depending on the viscosity required.

The thus prepared printing paste is printed on a fabric consisting of cotton by means of a cylinder printing machine. After drying, the printed fabric is padded with liquid sodium silicate of 48–52° Baumé and it is steamed, without interposition of an air passage or intermediate drying, in a tunnel steamer for 30 seconds at 101–103° C.

After an after-treatment of the fabric as described in Example 1 there is obtained a scarlet red print having good fastness to light and to wet processing.

EXAMPLE 10

40 parts of the dyestuff of the formula

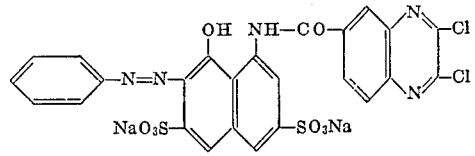

are dissolved in 300 parts of hot water and introduced into 400 parts of an equeous alginate thickener of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to 1000 parts by addition of 245 parts of water or 245 parts of an aqueous alginate thickener of 4% strength, depending on the viscosity required.

The thus prepared printing paste is printed on a fabric consisting of cotton by means of a cylinder printing machine. After drying the printed fabric is padded with liquid sodium silicate of 48–52° Baumé and it is steamed, without interposition of an air passage or intermediate drying, in a tunnel steamer for 15 seconds at 118–122° C.

After an after-treatment of the fabric described in Example 1 there is obtained a red print having good fastness to light and to wet processing.

EXAMPLE 11

40 parts of the dyestuff of the formula

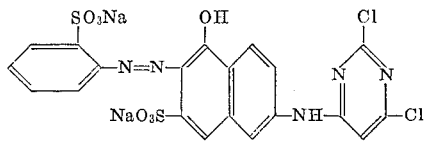

are dissolved in 300 parts of hot water and introduced into 400 parts of an aqueous alginate thickener of 4% strength which contains 5 parts of a complex forming agent on the basis of polymeric sodium metaphosphate per 1000 parts of thickener.

After addition of 15 parts of the sodium salt of meta-nitrobenzene sulfonic acid the whole is made up to 1000 parts by addition of 245 parts of water or 245 parts of an aqueous alginate thickener of 4% strength, depending on the viscosity required.

The thus prepared printing paste is printed on a fabric consisting of cotton by means of a cylinder printing machine. After drying, the printed fabric is padded with liquid sodium silicate of 48–52° Baumé and it is steamed, without interposition of an air passage or intermediate drying, in an arched steamer for 20 seconds at 101–103° C.

After an after-treatment of the fabric as described in Example 1 there is obtained an orange print having good fastness to light and to wet processing.

We claim:
1. A process for fast fixing reactive dyestuffs on textile materials made of native or regenerated cellulose fibers according to a two-phase steaming process, which comprises printing on said textile materials a printing paste containing a neutral to weakly alkaline thickening agent, water and either an organic dyestuff containing at least one β-hydroxyethylsulfone sulfuric acid ester group, vinylsulfone group, monochlorotriazine group, dichlorotriazine group, 2,2,3,3-tetrafluorocyclobutane-1-acryloylamino group, vinylsulfonylamino group, β-hydroxyethylsulfonylamino sulfuric acid ester group, β-phenylsulfonylpropionylamino group or dichloroquinoxaline radical, or an organic dyestuff containing at least one nucleophilic group and a colourless organic compound containing at least two reactive groups, which groups being capable of reacting with the fiber and with the nucleophilic groups of said dyestuff, then impregnating the print so obtained, after drying, with a liquid alkali metal silicate having a concentration in the range of from 48–52° Bé. at a pH-value ranging from 11 to 12, and subsequently steaming it.

2. A process as claimed in claim 1, wherein as alkali metal silicate a liquid sodium silicate of a density in the range of from 1.48 to 1.55 and of a proportion by weight of $Na_2O:SiO_2$ of 1:2.1 to 1:3 is used.

3. A process as claimed in claim 1, wherein an alkali metal silicate of room temperature is used.

4. A process as claimed in claim 1, wherein an alkali metal silicate of a temperature ranging from 40° to 50° C. is used.

5. A process as claimed in claim 1, wherein steaming of the print is effected at temperatures ranging from 101 to 125° C.

6. A process as claimed in claim 1, wherein steaming of the print is effected for a period of time in the range of from 10 to 40 seconds.

7. A process as claimed in claim 1, wherein steaming of the print is effected for a period of time up to 200 seconds.

References Cited
UNITED STATES PATENTS

| | | | |
|---|---|---|---|
| 2,892,670 | 6/1959 | Alsberg | 8—39 |
| 3,183,224 | 5/1965 | Benz et al. | 260—146 |
| 3,232,926 | 2/1966 | Randall | 260—152 |

FOREIGN PATENTS

| | | |
|---|---|---|
| 934,391 | 8/1963 | Great Britain. |
| 875,862 | 8/1961 | Great Britain. |

OTHER REFERENCES

Rose, "The Condensed Chemical Dictionary," p. 1053, 6th edition, published 1961 by Reinhold Pub. Corp., N.Y.

NORMAN G. TORCHIN, *Primary Examiner.*

D. LEVY, *Assistant Examiner.*

U.S. Cl. X.R.

8—82, 85, 87